Figure 1:
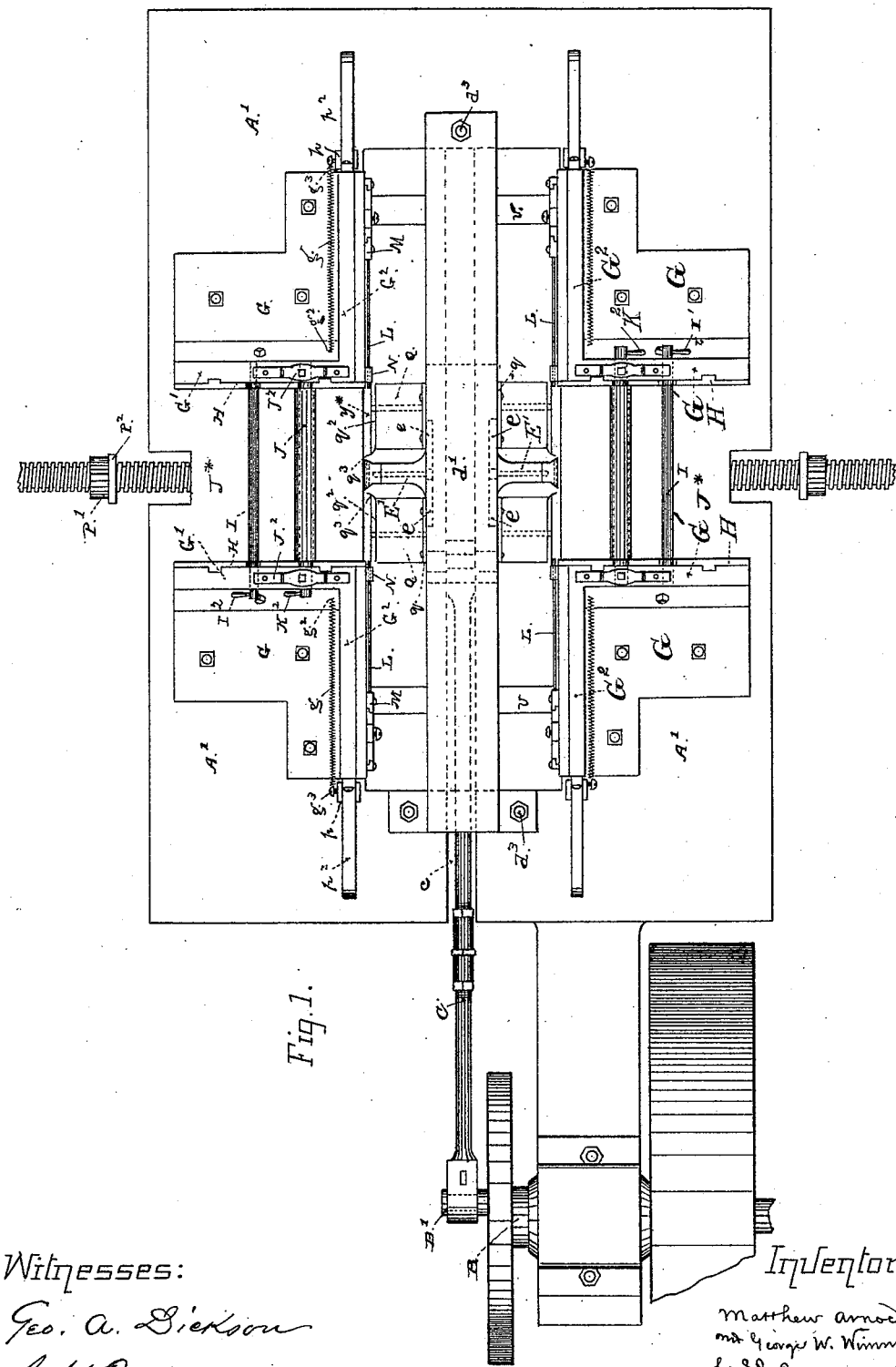

(No Model.) 6 Sheets—Sheet 2.

M. ARNOLD & G. W. WIMMER.
MATCH SPLINT MACHINE.

No. 304,398. Patented Sept. 2, 1884.

(No Model.)  6 Sheets—Sheet 3.
M. ARNOLD & G. W. WIMMER.
MATCH SPLINT MACHINE.
No. 304,398.  Patented Sept. 2, 1884.
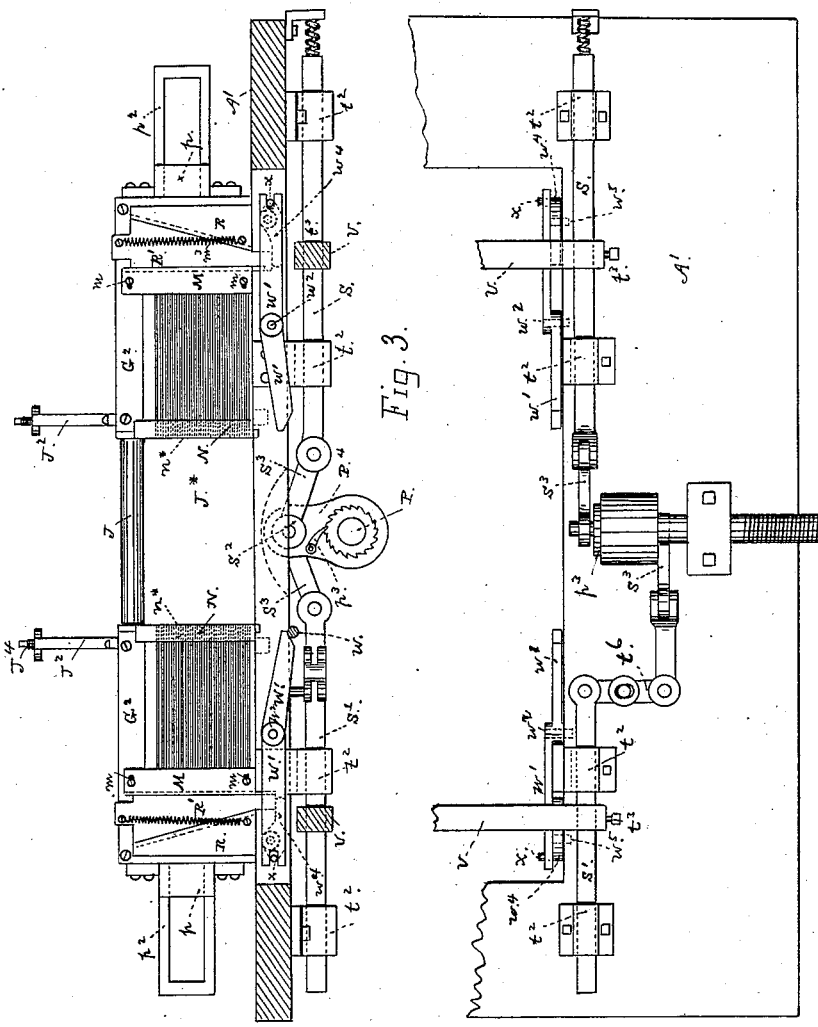
Witnesses:
Geo. A. Dickson.
G. W. Emerson
Inventors:
Matthew Arnold
and Geo. W. Wimmer
by E. E. Osborn Att'y.

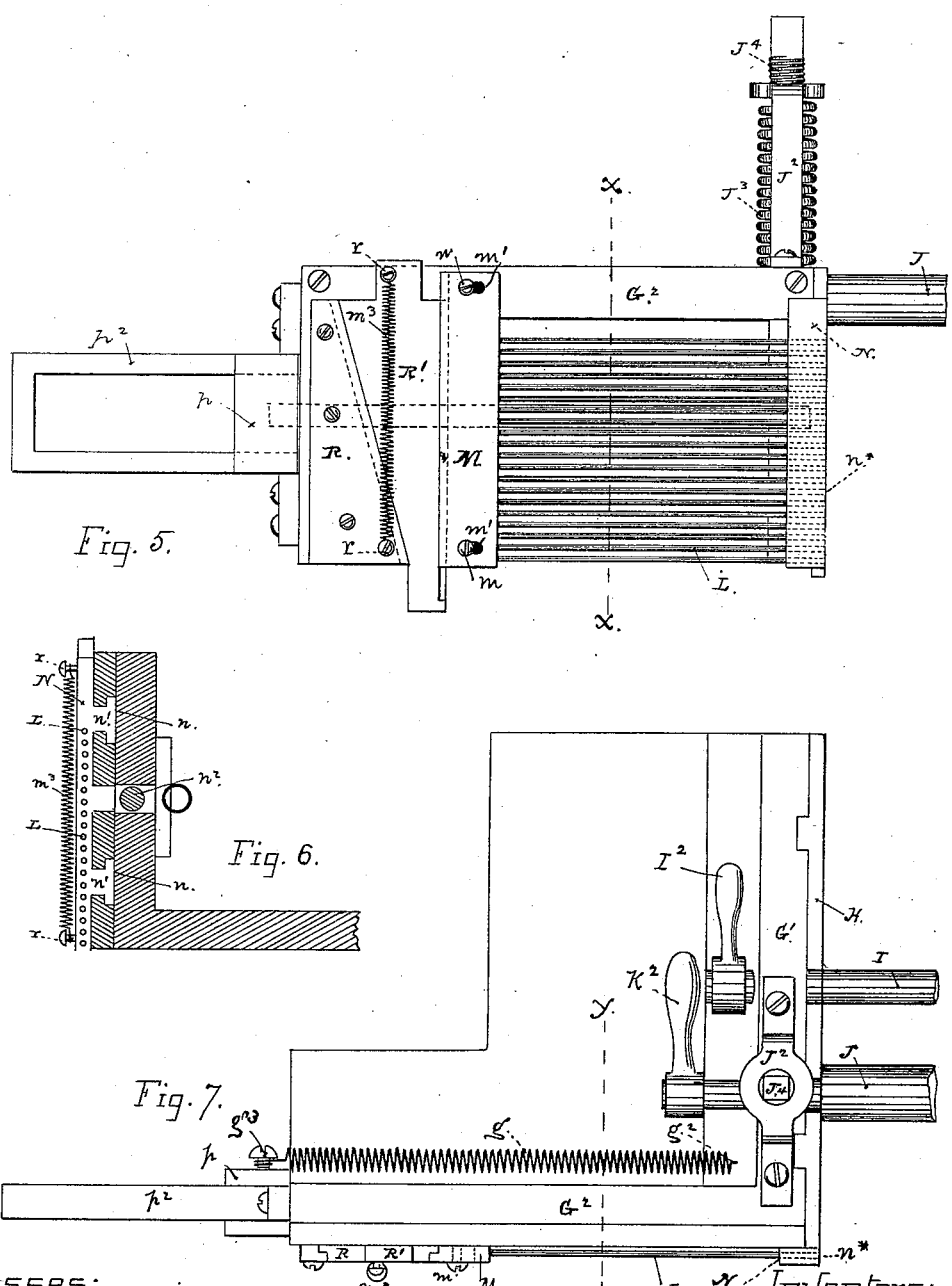

(No Model.) 6 Sheets—Sheet 5.
M. ARNOLD & G. W. WIMMER.
MATCH SPLINT MACHINE.
No. 304,398. Patented Sept. 2, 1884.
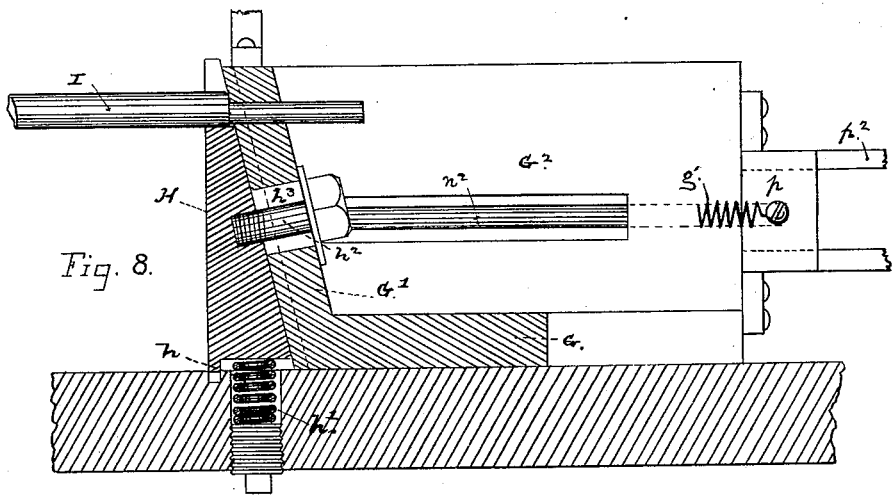
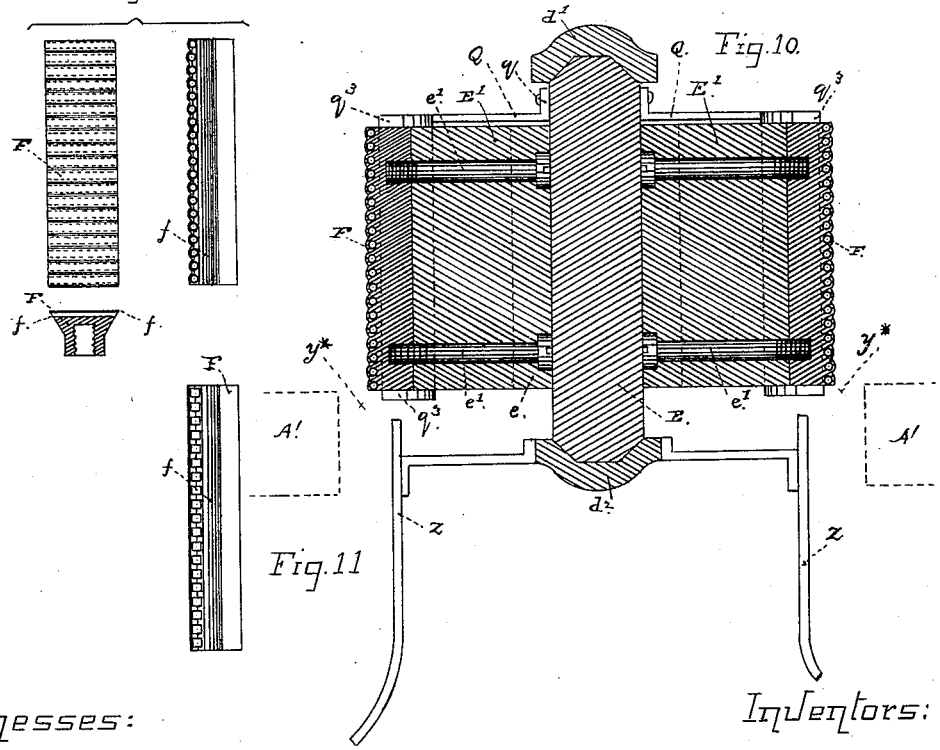

(No Model.) 6 Sheets—Sheet 6.

M. ARNOLD & G. W. WIMMER.
MATCH SPLINT MACHINE.

No. 304,398. Patented Sept. 2, 1884.

UNITED STATES PATENT OFFICE.

MATTHEW ARNOLD AND GEORGE W. WIMMER, OF SAN FRANCISCO, CAL.

MATCH-SPLINT MACHINE.

SPECIFICATION forming part of Letters Patent No. 304,398, dated September 2, 1884.

Application filed December 4, 1883. (No model.)

*To all whom it may concern:*

Be it known that we, MATTHEW ARNOLD and GEORGE W. WIMMER, citizens of the United States, residing in the city and county of San Francisco, State of California, have made and invented certain new and useful Improvements in Machines for Making Match-Splints; and we do hereby declare that the following is a full, clear, and exact description of the same.

Our invention has reference to machinery for cutting out match-splints from the block.

It consists in a certain novel construction and combination of parts, as hereinafter particularly described and pointed out, whereby we produce a machine having many advantages both as to the character of the work and the quantity capable of being turned out within a given time.

Our improvements include a reciprocating cutter, for making either round or square splints, and capable of cutting in both directions of its reciprocation; also, certain novel block clamping and feeding devices and mechanism; also, a novel stripping mechanism operating in connection with the cutter to discharge the finished splints from the cutting-tubes; and also the construction and combination of a double cutter-head and double block holding and feeding mechanism, producing a machine of increased capacity.

The following description fully explains the nature of our said improvements and the manner in which we proceed to construct, combine, use, and employ them, the accompanying drawings, in five sheets, being referred to by letters and figures.

The first part of our improvements consists of a multiple cutter composed of a number of tubular cutters formed in parallel order, one above another, closely together, and in size of aperture corresponding with the thickness of splint to be cut. This head has double cutting-edges, so that it cuts in both directions and at each stroke.

The second part or feature of our improvements consist of a gang of plungers or stripping-rods to clear the cutters at each stroke. These rods are confined at one end in a sliding head, and at the opposite end are held by a yielding guide in accurate line and position to register with the tubes of the cutter, so that as the end of the cut is reached the cutter slides over the ends of the rods and forces out the finished splints from the tubes. One gang or set of these stripping-rods is employed at each side of the block-holder, as the cutter-head has a reciprocating motion alternately to one side and the other, and cuts at each stroke.

The third part or feature of our improvements consists of a self-adjusting bed or block-holder having movable sides that accommodate themselves to any variation of the blocks, and a yielding pressure-roller acting upon the top of the block to properly confine it in place. A double cutter head and two block-holders and feed mechanism are also combined together to produce a machine of increased capacity.

Figure 2:
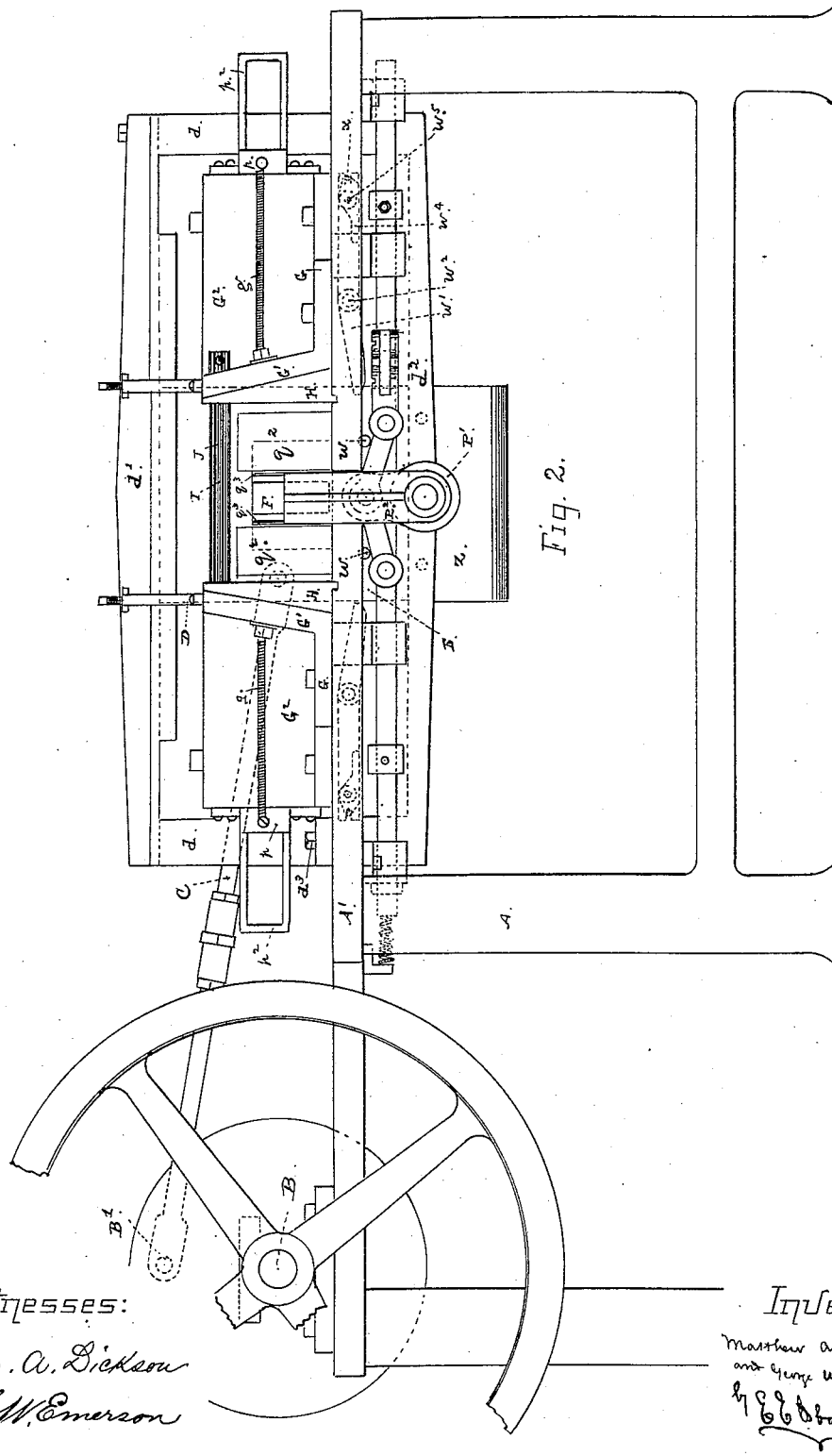
Figure 12:
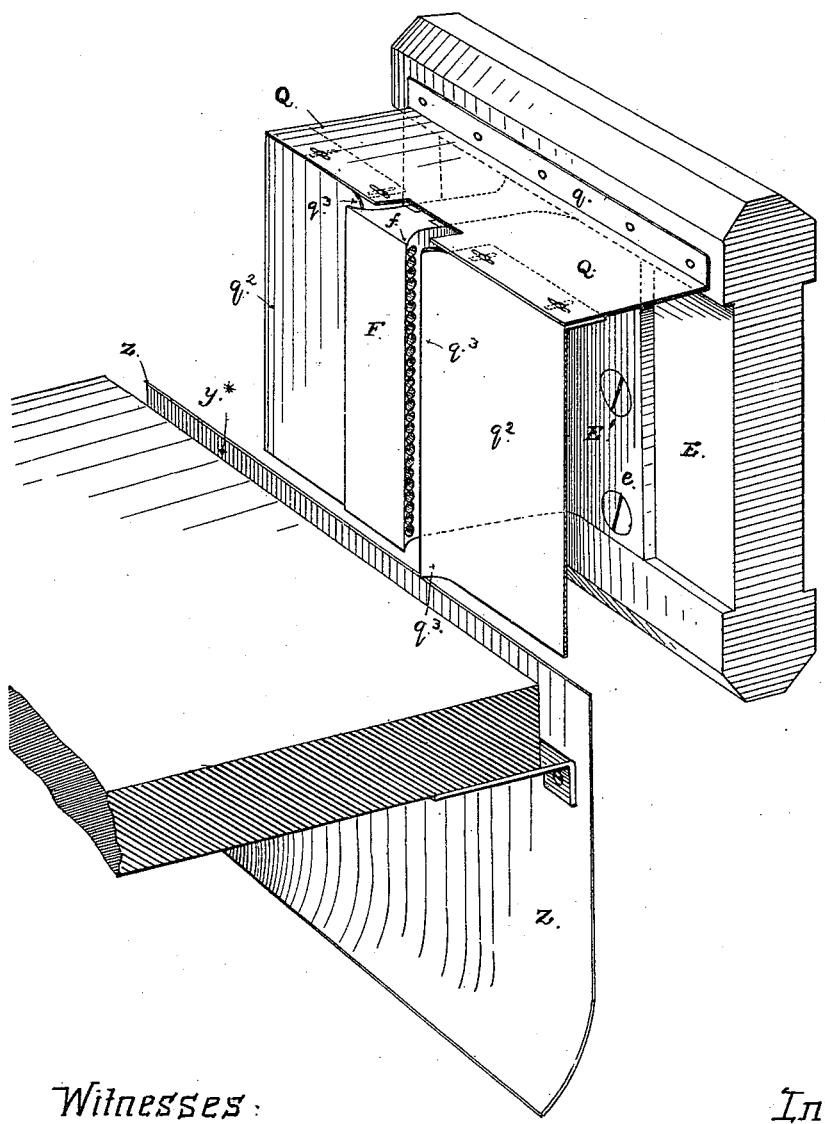

In the drawings referred to, Figure 1 shows a top view of a machine constructed in accordance with our invention and adapted to cut two blocks at once. Fig. 2 is a front elevation of the machine, Fig. 1. Fig. 3 is a detail elevation in longitudinal section at the front, or that end of the block-holder which faces the cutter-head, to show the double set of stripping-rods and connected mechanism. Fig. 4 is a plan of the parts as they appear from the under side of the table. Fig. 5 is a detail view, on a larger scale, of the stripping-rods and connected parts. Fig. 6 is a transverse section at the line $x\,x$, Fig. 5. Fig. 7 is a plan of the parts in Fig. 5. Fig. 8 is a longitudinal section through one side of the block-holder and clamping parts, the section being on a plane parallel with the travel of the cutter at about $y\,y$ in Fig. 7. Fig. 10 is a section showing the cutter-head, the fixed guide in which it travels, and shows the manner of securing the cutters to it. Figs. 9 and 11 give details of the cutter. Fig. 12 is a detail view showing the application of the angle-plates and apron.

A A is a suitable bench or frame supporting the fixed table or bed A'.

B is a driving-shaft, having a crank, B', from which connection is made with a sliding head by a connection rod or pitman, C. The table is open in the center and slotted at $c$ for the rod C. A long rectangular frame consisting of posts $d\,d$ and top and bottom guides, $d'\,d^2$, is set into the slot and secured to the table by bolts $d^3$, so that the lower guide, $d^2$, is somewhat below the level of the bed and the top guide above it. The form of these guides in cross-section is seen at Fig. 10.

The cutter-head consists of the slide-bar E, that takes into the guides, and the blocks E′, that hold the cutters. The blocks are fastened by screws taking through flanges $e$ $e$ into the bar E, and the cutter is secured to its block by screws $e'$, entering from behind and applied before the block is fixed in place. In a single machine the slide would have but one block and its cutter, but for a double machine the head has two blocks and their cutters. The cutter is a solid plate, F, the face somewhat broader than the back, and the vertical sides angular to give beveled cutting-edges $f$. Each cutting-point is a tube, either round or square on cross-section, and the whole length of the cutting-edge $f$ is composed of a number of these tubes in close vertical rows, one above the other. The back of this plate is then drilled and tapped to take the fastening-screws $e'$. These tubes are drilled and finished, as in Fig. 9, for round splints, or, as in Fig. 1, for square splints.

Alongside and in line with the inner edge of the opening in the table are two angle-plates, G G, having faces G′ G² at right angles to each other, and bolted to the table, with the faces G′ at right angles to the path of the cutter and at suitable distance apart to take in a splint-block. The space J* between these sides and the table-surface constitutes the block-holder, while the faces G² afford support for the stripping-rods, over which the cutter is caused to move.

To each side G′ is fitted a tapering face-plate, H, having vertical outer face to take against the splint-block, and an inclined inner face of equal slant with the inclined face G′. Coil-springs $h$ in sockets $h'$ in the bed beneath the face-plate, and bearing against its base, exert a constant upward pressure. The plate is held in place against the fixed incline G² by the screw-bolt $h^2$, entering from the back of the plate through a long slot, $h^3$. A long shaft or roller, I, is set eccentrically in bearings in the sides G′, to bear upon the top edge of the wedge-plates, and is provided with a handle, I², on one end outside the bearing. Rotation of this shaft will bring pressure upon the tops of the wedge-plates sufficient to hold them down against the action of the springs. This serves to spread the plates apart and permit ready insertion and adjustment of the splint-blocks in the recess J*.

A pressure-roller, J, is mounted over the top of the block-holder in yielding boxes set in the frame J² on the stationary sides G′. The pressure is obtained from springs J³, bearing upon the boxes and resting against the ends of screw-threaded follower J¹, working through the top of the frames J², and by which the pressure is regulated. The roller J is a loose sleeve turning upon this shaft, so that by means of a hand-lever, K², on one end the shaft can be rotated in the boxes and the roller surface raised from or brought down into contact with the top of the splint-block. The other face, G², of each angle-plate G is set in line with the plane of movement of the cutter to support the stripping wires or rods L, that push out and separate the cut splints from the cutter. These rods are equal in number to the tubes composing the cutter, and they are fixed into a head, M, at one end, while their outer ends, projecting toward the cutter, take through a perforated yielding guide, N, held to the face of the head G² by dovetail slots $n$ and tongues $n'$.

A rod, $n^2$, connects the guide N with a sliding head, $p$, held in a slotted guide, $p^2$, and a coil-spring, $q$, connected at $q^2$ to a fixed point in the part G, and at $q^3$ to the head, brings the guide N into position, with its vertical face $n^*$ exactly in line with the face of the wedge-plate that constitutes the side of the splint-block holder. In this position of the guide the free ends of the push-rods L rest in the holes of the guide-plate, while their ends are flush with the outer face. As the edge of the cutter leaves the wood and strikes this face at the end of the cut, the guide yields to the cutter and is forced back along the rods, exposing the ends. This movement of the guide, while permitting the cutter to move forward over the rods, affords support to the rods in advance also of the cutters. The rods are therefore allowed to pass through the cutter and clear them of the finished splints, and their position in accurate line with reference to the apertures of the cutters is always insured. The guide, also, being pressed back by the cutter, follows it closely on the return-stroke, and as the cutter leaves the ends of the wires again the guide is brought forward into place by the action of the spring and push-rod $q$. As the cutter is double and takes the blocks at each stroke, there are two gangs of wires, L L, and connected parts.

The block from which the splints are made rests in the holder G′ G′, and its sides are close against the vertical faces $n^*$ of the yielding guides, so that as the cutter leaves the block at each end it passes on to the wires by forcing back the yielding guides, and the ends of the wires then meet and bear against the ends of the wood in the tubes. If, however, there is no clearance for the cut splints after the cutting operation is completed, they would catch and be held up by the ends of the push-wires, and on the return-stroke of the cutter-head they would be liable to catch into the cutter again. To avoid this and insure the complete discharge of the splints at each cut, the plate M has a short backward movement at intervals to draw back the ends of the wires L L clear of the line of the block. This movement is obtained by setting the screws $m$ through slots $m'$ $m'$ in the head and placing behind the back edge of the head plates R R′, with inclined faces, one, R, stationary and the other, R′, sliding vertically while being confined between the head M and the fixed plate.

This vertical movement of the movable plate is obtained through the action of a stop, $w$, on the cutter-head, a lever, $w'$, pivoted at $w^2$ on a stud on the table just under the plate $G^2$, and a short rocking toe, $w^4$, having a fulcrum at $w^5$, and attached to the outer end of the lever $w'$ by a pin, $x$, on the one part and a slot on the other. The lever $w'$ is depressed at the inner end to be in line with the traveling stud $w$, and has a beveled point that as the cutter-head advances is struck by the stop $w$, and the end of the lever thrown up. This motion by raising the toe $w$ throws up the wedge-plate $R'$, resting upon it, and the movement of the part $R'$ on the fixed incline $R$ therefore permits the head $M$ to slide back horizontally a short distance. A coil-spring, $m^3$, attached at $r\ r$, brings the plate $R'$ back into place as the stop $w$ leaves the end of the lever $w'$ on the return-stroke of the cutter-head, and the head M is brought forward into position again. These parts are so timed that the head M begins to move back when the cutting-tubes have fairly taken over the ends of the push-wires L, and therefore for a short time in the stroke of the cutter-head the wires yield and are pushed back by the pressure of the wood confined in the cutting-tubes. Instead of meeting the resistance of fixed points, and being pushed out by them as the cutter continues to advance, the splints within the cutting-tubes are carried longitudinally back with the cutter by reason of this yielding movement, and thus the opposite ends of the splints are drawn away from the vertical face of the opposite guide, N. At the end of this limited movement the wires L are stationary, and the continued advance of the cutter forces the splints from the tubes. Being clear at the ends they drop down through the opening in front of the block. Separation of the chips and waste from the finished splints is obtained by fixing to the cutter-head, in close relation to the edges of the cutters, two angle-plates, Q Q, having flanges $q$, by which they are fastened to the blocks E, and a vertical depending face, $q^2$, extending for the full length of the cutter. From the inner edges of these faces are curved lips $q^3$, that project forward in close relation to the inner cutting-edges of the tubes, but leaving a small space between them for the entrance of the chips as they curl from the cutting-edge. From their form and position these curved lips operate to deflect the chips into the space behind the angle-plates. The finished splints are then discharged through the space $y^*$ outside the plates Q. The apron Z has such position with relation to this opening $y^*$ that the splints are directed by it toward the front, while the chips fall inward under the table, and are directed by a fixed plate or apron, Z, into a suitable receptacle beneath. These parts are seen in Figs. 1, 2, and 11.

The feeding mechanism shown in Figs. 2, 3, and 4 consists of a screw-shaft, P, a traveling nut, $P'$, having a knee, $P^2$, to bear against the back of the splint-block, and a pawl-and-ratchet feed, which operates at each stroke of the cutter-head to move the screw-shaft and feed the block up to the required amount. The pawl $p^3$ is fixed on the side of a hub or collar, $P^4$, loose on the smooth end of the screw-shaft, and slide-rods $s\ s'$ are connected to this part at $s^2$ by links $s^3\ s^3$. The rod $s$ plays through guides $t^2$ on the under side of the table, and are secured at $t^3$ to cross-bars $v$, that extend across the opening of the table, and in line to be struck by the end of the cutter-head at each end of the stroke. The rod $s$ has straight connection with the pawl-carrier $P^4$, and acts by a direct backward movement, but the rod $s'$, that operates at the opposite end, is connected with the pawl by a lever, $t^6$, fulcrumed to the table. As the cutter-head strikes the bar $v$, this rod $s'$ in running backward, pushes the pawl-carrier over and turns the ratchet.

The same construction of parts shown in Fig. 4 will be employed at the opposite side of the table.

When a double-acting machine is made, as represented in Figs. 1 and 2, the bars $v$ will connect with corresponding rods, $s\ s'$, on the two sides of the table. Thus both screw-shafts P will turn simultaneously and both splint-blocks be fed up to the cutters.

Having thus fully described our invention, what we claim, and desire to secure by Letters Patent, is—

1. The combination of the double end tubular cutter having reciprocating movement in front of a block-holder, a feed mechanism operating against said block to feed it up at the end of each stroke of the cutter, and a set of plungers at each side of the block in line with the path of the cutter, and consisting of a series of wire rods corresponding in number, diameter, and position with the tubular passages of the cutter, substantially as hereinbefore described, to operate as set forth.

2. The combination, with the reciprocating cutter, of the set of plungers L L, mounted in the head M, the yielding guide N, the wedge-plates R R—one fixed and the other movable—the spring $m^3$, and mechanism operated by or from the movements of the cutter-head to throw up the yielding plate $R'$, substantially as described.

3. The combination, with the sliding head M, having the plunge-rods fixed therein, of the perforated guide N, through which the plunge-rods extend, adapted to yield to and move back upon the rods to expose the free ends thereof on the advance of the cutter, and a spring to bring the guide forward into position again as the cutter withdraws from the rods, substantially as described.

4. The combination, with the reciprocating cutter formed of tubes, of the plunge-rods, consisting of wires L, corresponding in number and position with the tubes composing the cutter, and mechanism whereby said plunge-rods are held stationary until the cutter-tubes have fairly passed over the ends and the rods have taken into the tube, and then have a backward or yielding movement in a longitudinal direction under pressure of the splints in the tubes, and finally, as the cutter continues to advance, are held stationary to present fixed points of resistance to the splints in the tubes as the cutter passes over them to complete its stroke.

5. The combination, with a suitable frame or table, of the reciprocating cutter-head carrying the multiple tubular cutter F, means for reciprocating it in front of a block-holding recess, J*, the rods L, constituting a stripping device to clear the tube at the end of each cut, a clamping device to confine the block, the screw-shaft and feeding-head, and mechanism whereby the said shaft receives intermittent rotation by or from the movements of the cutter-head, and in turn with relation to the strokes thereof, as described.

6. The combination, with the angle-plates G' G', forming the block-holding recess J*, of the wedge-plates H, springs $h\,h$, and eccentric pressure-roller I, substantially as and for the purpose set forth.

7. The combination, with the recess J*, of the shaft set eccentrically into yielding boxes, and carrying the sleeve, the adjustable springs $J^3$, and a handle for turning said shaft, substantially as and for the purpose set forth.

8. The combination, with the feed-screw P, of the pawl-carrier $P^4$, with its pawl pivoted on the carrier $P^4$, ratchet-wheel fast on screw P, rods $s\,s'$, and links $s^3$, connected with the carrier $P^4$, and the stop-bars $v$, secured on the rods $s\,s'$, and interposed in the line of travel of the cutter-head to give motion to feed, substantially as and for the purpose set forth.

9. The combination, with the yielding head M, fixed plate R, yielding wedge-plate R', lying between plate R and head M, and spring $m^3$, attached to plate R' at one end, and a fixed point at the other, to keep plate R' forced in between the plate R and head M, of the lever W', pivoted toe $W^4$, and stop W on the cutter-head, operating against the lever to cause the wedge R' to give way and permit the head M to yield, as set forth.

10. The multitubular cutter having double cutting-faces $f$, and adapted to be secured in position on a reciprocating cutting-head, substantially as hereinbefore described.

11. The combination of the slide E, blocks E', secured thereon, the fastening-bolts $e'\,e'$, extending through the blocks E', and the cutters F, secured on the outer surface of the blocks by the bolts $e'\,e'$, as set forth.

12. A machine for cutting out match-splints from the block, consisting of the following elements or mechanism, viz: a splint-block holder, a clamping device to confine the block without interfering with its progression up to the cutter, an intermittent feed mechanism, a double end multitubular cutter having reciprocation in line past the face of the confined block, a stripping device interposed in the path of the cutter at each end of its stroke, and consisting of a set of plungers corresponding in number and position with the tubular passages of the cutter, that are adapted to enter the cutter as it leaves the edge of the block and forces out the cut splints, substantially as hereinbefore described.

13. The combination, with the reciprocating cutter-head F, of the plates Q, having faces $q^2$, with the curved lips $q^3$, and the fixed apron Z on the table, having position with relation to the travel of the cutter-head, as described, for the purpose set forth.

MATTHEW ARNOLD. [L. S.]
   GEORGE W. WIMMER. [L. S.]

Witnesses:
 G. W. EMERSON,
 JNO. L. TAGGARD.